United States Patent
Dahl et al.

(10) Patent No.: US 8,311,873 B2
(45) Date of Patent: Nov. 13, 2012

(54) APPLICATION RISK FRAMEWORK

(75) Inventors: Erik D. Dahl, Charlotte, NC (US);
Rajat Wadhwani, Closter, NJ (US);
Michael J. Ragunas, Weddington, NC (US)

(73) Assignee: Bank of America Corporation, Charlotte, NC (US)

( * ) Notice: Subject to any disclaimer, the term of this patent is extended or adjusted under 35 U.S.C. 154(b) by 403 days.

(21) Appl. No.: 12/621,550

(22) Filed: Nov. 19, 2009

(65) Prior Publication Data

US 2011/0119106 A1    May 19, 2011

(51) Int. Cl.
*G06Q 10/00* (2012.01)

(52) U.S. Cl. .............. 705/7.28; 705/7.11; 705/7.12

(58) Field of Classification Search ......... 705/7.11–7.39
See application file for complete search history.

(56) References Cited

U.S. PATENT DOCUMENTS

| | | | | |
|---|---|---|---|---|
| 7,359,865 | B1* | 4/2008 | Connor et al. | 705/7.28 |
| 7,672,921 | B1* | 3/2010 | Clay et al. | 706/45 |
| 2003/0135399 | A1* | 7/2003 | Ahamparam et al. | 705/7 |
| 2004/0015376 | A1* | 1/2004 | Zhu et al. | 705/7 |
| 2005/0114829 | A1* | 5/2005 | Robin et al. | 717/101 |
| 2006/0031413 | A1* | 2/2006 | Enenkiel | 709/219 |
| 2006/0247957 | A1* | 11/2006 | Gopfert et al. | 705/7 |
| 2008/0255910 | A1* | 10/2008 | Bagchi et al. | 705/8 |
| 2009/0024425 | A1* | 1/2009 | Calvert | 705/7 |
| 2010/0125651 | A1* | 5/2010 | Zapata et al. | 709/220 |

OTHER PUBLICATIONS

Janne Ropponen and Kalle Lyytinen "Components of Software Development Risk: How to Address Them? A Project Manager Survey" IEEE Transactions on Software Engineering, vol. 26, No. 2, Feb. 2000.*

Higuera, Ronald P.; Haimes, Yacov Y. "Software Risk Management." Jun. 1996.*

* cited by examiner

*Primary Examiner* — Johnna Loftis
*Assistant Examiner* — Alan S Miller
(74) *Attorney, Agent, or Firm* — Banner & Witcoff, Ltd.; Michael A. Springs

(57) ABSTRACT

A risk framework is described for computing application risks. A risk value associated with each of one or more products included in an application may be determined. The risk value associated with each of the products may be classified as declining software risk, not-permitted software risk, declining hardware risk, and not-permitted hardware risk and may be weighted and summed to produce a technical risk score. A business criticality score may be computed based on how critical the application is to a business. The technical risk score and the business criticality score may be weighted and summed to produce a composite risk score. Based on one or more of the scores, planning may be conducted and strategies may be formulated to mitigate risk.

17 Claims, 6 Drawing Sheets

APPLICATION RISK FRAMEWORK

FIELD

Aspects of the present disclosure relate to risk management. More specifically, aspects of the disclosure relate to computing risk associated with one or more hardware and software products used within business applications and presenting strategies for mitigating the risk.

BACKGROUND

Computing technologies have changed the way people and businesses accomplish various tasks. For example, rather than visiting a bank to withdraw funds, people now frequently go to automated teller machines (ATMs) to withdraw cash, particularly during evening or nighttime hours.

Hardware and software supporting ATMs (or computing platforms, more generally) tend to become inoperative over time. This inoperability may be the result of breakage/wear-and-tear, functional design limitations that only demonstrate themselves once a computing application has been implemented in the field, advances in technology that render the computing application (or product components thereof) obsolete, reduction or loss of vendor support and maintenance.

Classifications of "declining" and "not-permitted" (DNP) risk assessments are commonly used for purposes of forecasting risk of aging hardware and software products. Current methods and techniques for assessing DNP risk: (1) fail to account for applications that have multiple aging products, (2) take merely not-permitted classifications into account, and (3) fail to incorporate aging hardware risks.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects described herein are directed to identifying declining and not-permitted use (DNP) risk associated with one or more applications.

The declining aspect of the DNP risk may measure or represent a degree of degradation in terms of functionality or utility associated with one or more products included in an application. The declining aspect may be indicative of hardware and/or software component(s) that are still supported but are decreasing in terms of use or support as a result of aging.

The not-permitted use aspect of DNP risk may measure or represent a degree to which one or more products included in an application are expected to be phased out of use or production due to any number of factors or reasons. Factors/reasons that may be included are changes in business policies or contracts, changes in regulations or laws, security vulnerabilities, vendor ability/inability to continue to support a product, employee skills (or lack thereof), a degree of product complexity (or a component thereof), and the like.

Aspects of the disclosure are directed to an identification of risk categories. One or more managers, executives, officers, employees (hereinafter officials) may classify risk into one or more categories. The categories may relate to applications incorporating hardware products and software products, or a combination thereof.

Sub-categories may be included within the risk categories to take into account both declining product uses as well as not-permitted product uses. Aspects described herein may relate to assigning a weight to the declining product uses and the not-permitted product uses in order to compute a DNP technical risk score.

Aspects described herein may relate to computing a business criticality score for applications. The business criticality score may take into consideration business uses of an application. Such business uses may include the size/volume/distribution, whether customers (directly) engage the application, transaction volumes conducted with respect to the application.

Aspects described herein may relate to computing a DNP composite risk score. The DNP composite risk score may be based on a computed DNP technical risk score and a business criticality score. The DNP technical risk score and the business criticality score may be weighted relative to one another for purposes of computing the DNP composite risk score. One or more of the DNP composite risk score, the DNP technical risk score, and the business criticality score may be used to facilitate planning and strategizing in order to mitigate or eliminate risk.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
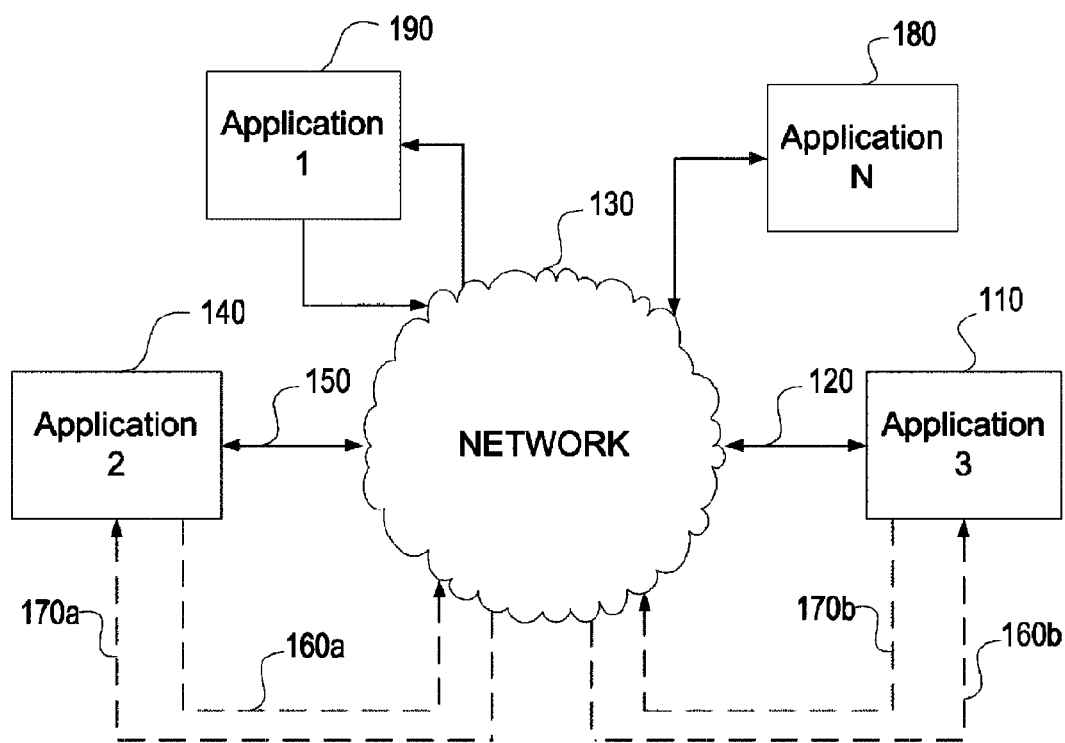
FIG. 1 illustrates a network computing environment in which various aspects of the disclosure may be implemented.

In accordance with various aspects of the disclosure, apparatuses, systems and methods are described for assessing the risk associated with computing applications incorporating one or more hardware and/or software products. While largely stated in terms of risk related to computer applications and the components thereof, the techniques and methodologies described herein may be adapted to accommodate other forms of risk assessment.

In some embodiments, risk assessment may be obtained in a manner ensuring analytical rigor and achieving consistent thresholds across business units. Elements of risk analysis and assessment may include defining an application and the application's product components, categorizing the components as based on hardware, software, or both hardware and software, determining a contribution weight attributable to decline and a contribution weight attributable to not-permitted uses, computing a declining and not-permitted use (DNP) technical risk score, computing a business criticality score, and computing a DNP composite risk score. Score normalization processes may be used to facilitate a comparison between scores or calculations.

The elements of risk analysis and assessment may be applied across business/financial units on a consistent basis. In this manner, a top-down organizational framework may be generated that eliminates or mitigates a likelihood of inconsistent administration. In some embodiments, the elements may be modified to accommodate differences between the business/financial units.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect.

FIG. 1 illustrates a network computing environment 100 suitable for carrying out one or more aspects of the present disclosure. For example, FIG. 1 illustrates a networked computing environment of business applications (Application 1, 2, & 3) as an example of those found in many businesses. Each application is treated independently for risk management purposes, although they may be interrelated in various ways through network 130. By virtue of the connectivity as shown, Application 1 190 and Application 3 110 may communicate with one another. Such communications may enable the exchange of various types of information. For example, the communications may include data to be exchanged between Application 1 190 and Application 3 110. Such data may include images, files, and the like. The communications may further include additional information such as control information.

Connections 120 and 150 illustrate interconnections for communication purposes. The actual connections represented by connections 120 and 150 may be embodied in various forms. For example, connections 120 and 150 may be hardwired/wireline connections. Alternatively, connections 120 and 150 may be wireless connections. Connections 120 and 150 are shown in FIG. 1 as supporting bi-directional communications (via the dual arrow heads on each of connections 120 and 150). Alternatively, or additionally, computing environment 100 may be structured to support separate forward (160a and 160b) and reverse (170a and 170b) channel connections to facilitate the communication.

Computing environment 100 may be carried out as part of a larger network consisting of more than two devices. For example, Application 2 140 may exchange communications with a plurality of other Applications (e.g., Application N 180) in addition to Application 3 110. The communications may be conducted using one or more communication protocols.

As used herein, the term application refers to an act of bringing something to bear; using it for a particular purpose or objective. In the context of a computer based implementation, an application refers to the integration of one or more software components on one or more computers or other hardware components to achieve a particular purpose or objective. Examples of software components might include a customer servicing system for use by bank tellers, an online bill-payment solution on the internet, a project management tool and/or other software implementations.

Figure 2:
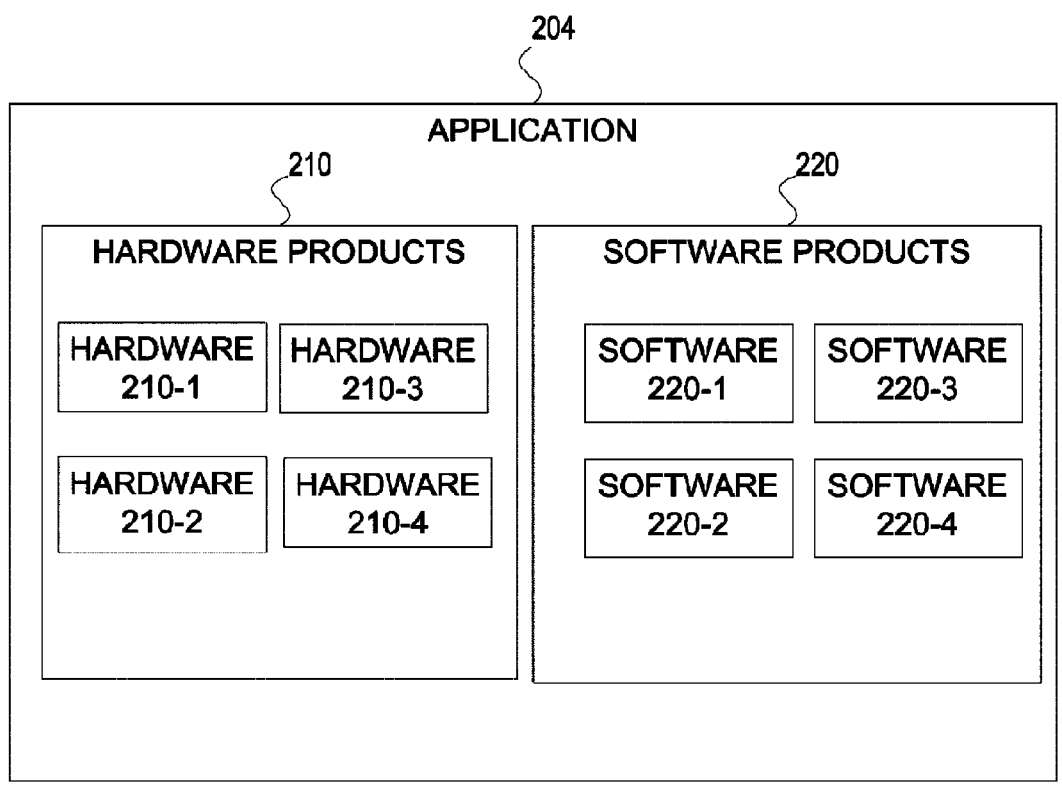
FIG. 2 illustrates an organization of an application in which various aspects of the disclosure may be implemented.

FIG. 2 illustrates an organization of an application 204 in which various aspects of the disclosure may be implemented. In particular, as shown in FIG. 2, application 204 includes a hardware product 210 and a software product 220. Hardware and software products 210 and 220 may include a number of specific hardware and software components. More specifically, hardware product 210 may include hardware components 210-1, 210-2, 210-3 and 210-4, and software product 220 may include software components 220-1, 220-2, 220-3 and 220-4. Application 204 is illustrative. In some embodiments, an application may contain either or both hardware and software products (and any number of each) and may contain any number of components.

Figure 3:
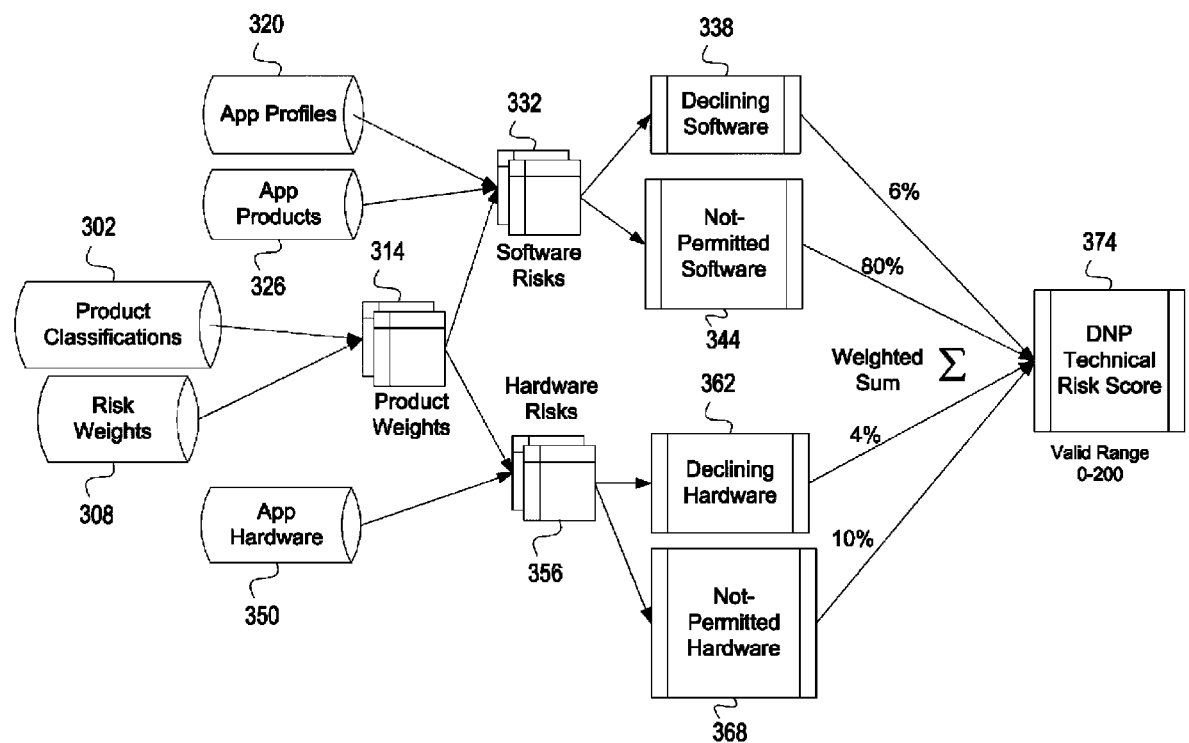
FIG. 3 illustrates a flow diagram for computing a DNP technical risk score in accordance with one or more aspects of this disclosure.

FIG. 3 illustrates a flow diagram for computing a DNP technical risk score. As shown, FIG. 3 includes product classifications 302 and risk weights 308.

Product classifications 302 may serve to identify whether specific hardware or software components are considered declining or not-permitted. Examples of hardware components include 210-1 and 210-2 and examples of software components include 220-1 and 220-2.

Risk weights 308 may serve to assign a risk value to the identified products, wherein the assigned risk value distinguishes one product from another in terms of risk. Factors that may be examined when assigning a product risk value to a product include breath of use, vendor support, security exposures, alignment with standards, skill sets required to operate the products, longevity of vendor support of the product, and the like.

Product classifications 302 and risk weights 308 may combine to generate product weights 314. Product weights 314 may identify products and corresponding risk values from a perspective of both hardware components and software components included in an application.

Product weights 314 may combine with application profiles 320 and application products 326 to produce Software Risks 332. Application profiles 320 may refer to and include information related to the types and distribution of applications incorporating one or more hardware/software products. For example, application profiles 320 may include data related to a size or scope of implementation distribution (e.g., is the application a regional application, is the application distributed throughout the United States), whether the application shares a customer interface (e.g., does the application include an automated teller machine (ATM), or does the application function internal to a bank or financial services organization), whether the application includes personal or sensitive data (e.g., a customer's social security number, a PIN number), the number or volume of transactions conducted. In more general terms, application profiles 320 may include data characterizing an environment in which one or more applications operate.

Application products 326 may include data that serves to identify one or more products included in an application. As such, application products 326 may include an identification of applications and a corresponding identification of products included within each application. In some embodiments, application products 326 may identify software components included in each of the products.

Software Risks 332 may take as inputs information/data from product weights 314, application profiles 320 and application products 326, and produce as output software risk scores. For example, Software Risks 332 may use the information/data originating from application profiles 320 to characterize an environment in which an application operates or is expected to operate. Software Risks 332 may then identify which software is included within each application by examining the software component risk values generated by product weights 314. In this manner, Software Risks 332 may generate a software risk score associated with an application based on the software component risk values and information characterizing the application in terms of its operating environment and its constituent products.

As shown in FIG. 3, the output software risk scores may be further subdivided or categorized into a declining software score 338 and a not-permitted software score 344. Declining software score 338 may be indicative of software components included in products (which, in turn, are included in the application) that are still supported but are decreasing in terms of use or support as a result of aging. Not-permitted software score 344 may be indicative of software components that are no longer supported. Factors that may be taken into consideration with respect to both declining and not-permitted status include security breaches (e.g., software component failure (e.g., a design bug), vendor neglect), vendor inability to continue to support the software (which may be due to a lack of vendor funding, for example), or other risk factors such as lack of employee skills, software component complexity, and the like.

A similar score generation may be conducted with respect to hardware as shown in FIG. 3. More specifically, FIG. 3 includes application hardware 350. Application hardware 350 may include information and data that serves to identify one or more products used by an application. As such, application products 350 may include an identification of applications and a corresponding identification of products used by each application.

Hardware risks 356 may function in a manner similar to software risks 332 described above. Specifically, hardware risks 356 may produce output hardware risk scores, which may be categorized or classified as a declining hardware score 362 and a not-permitted hardware score 368. While not shown in FIG. 3, in some embodiments hardware risks 356 may accept as input information/data from application profiles 320 for purposes of producing output hardware risk scores in a manner similar to the production/generation of software risk scores by software risks 332 as described above.

As shown in FIG. 3, a DNP technical risk score 374 for an application may be computed as a weighted sum of declining software score 338, not-permitted software score 344, declining hardware score 362, and not-permitted hardware score 368. The weights of 6%, 80%, 4% and 10% shown in FIG. 3 with respect to declining software score 338, not-permitted software score 344, declining hardware score 362, and not-permitted hardware score 368 are illustrative. The referenced weights may be modified in some embodiments to account for variations across applications, products, or hardware/software implementations. For example, the referenced weights may be adjusted to account for varying quality of source data, to compensate for missing risk weights, to emphasize particular short term risk management needs, or for other purposes.

Figure 4:
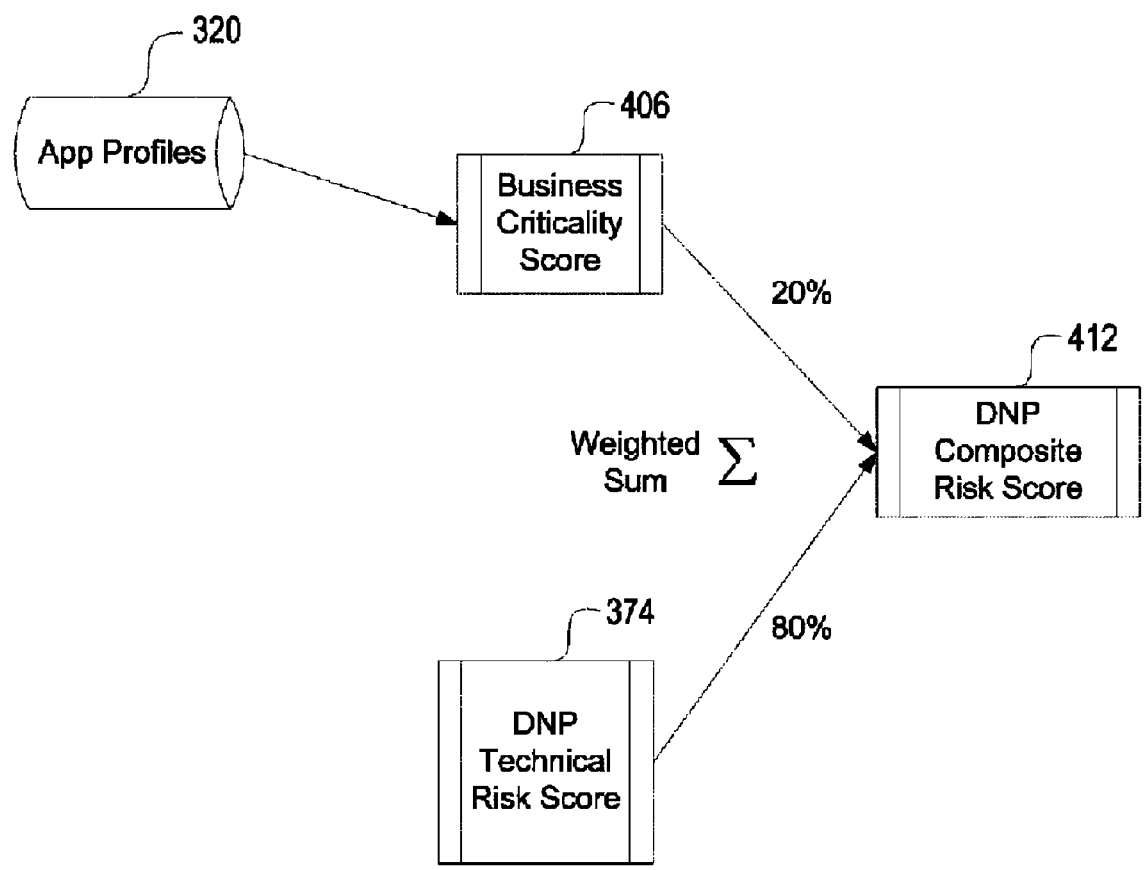
FIG. 4 illustrates a flow diagram for computing a DNP composite risk score in accordance with one or more aspects of this disclosure.

FIG. 4 illustrates a flow diagram for computing a DNP composite risk score. In particular, FIG. 4 demonstrates the computation of a business criticality score 406 for an application based on inputs received from application profiles 320. As discussed above, application profiles 320 may include factors or information such as the size or scope of implementation distribution, whether the application shares a customer interface, whether the application includes personal or sensitive data, the number or volume of transactions conducted. Application profiles 320 may also include information that takes into consideration legal constraints, political opinions, consumer survey responses, and the like in order to assess how critical an application is to a given business (e.g., a financial services provider, a bank) for purposes of generating business criticality score 406.

Business criticality score 406 may be combined (e.g., summed) with DNP technical risk score 374 to generate a DNP composite risk score 412. DNP technical risk score 374 and business criticality score 406 may be weighted relative to one another in order to emphasize one score relative to another in the generated/computed DNP composite risk score 412. For example, as shown in FIG. 4, DNP technical risk score 374 represents 80% of DNP composite risk score 412 and business criticality score 406 represents 20% of DNP composite risk score 412. In some embodiments, values other than 80% and 20% may be used for the weights. For example, when assessing risk with respect to a group of applications that are of extreme business significance to consumers, the weight assigned to the business criticality score may be increased relative to the weight assigned to the DNP technical risk score when computing the DNP composite risk score.

Figure 5:
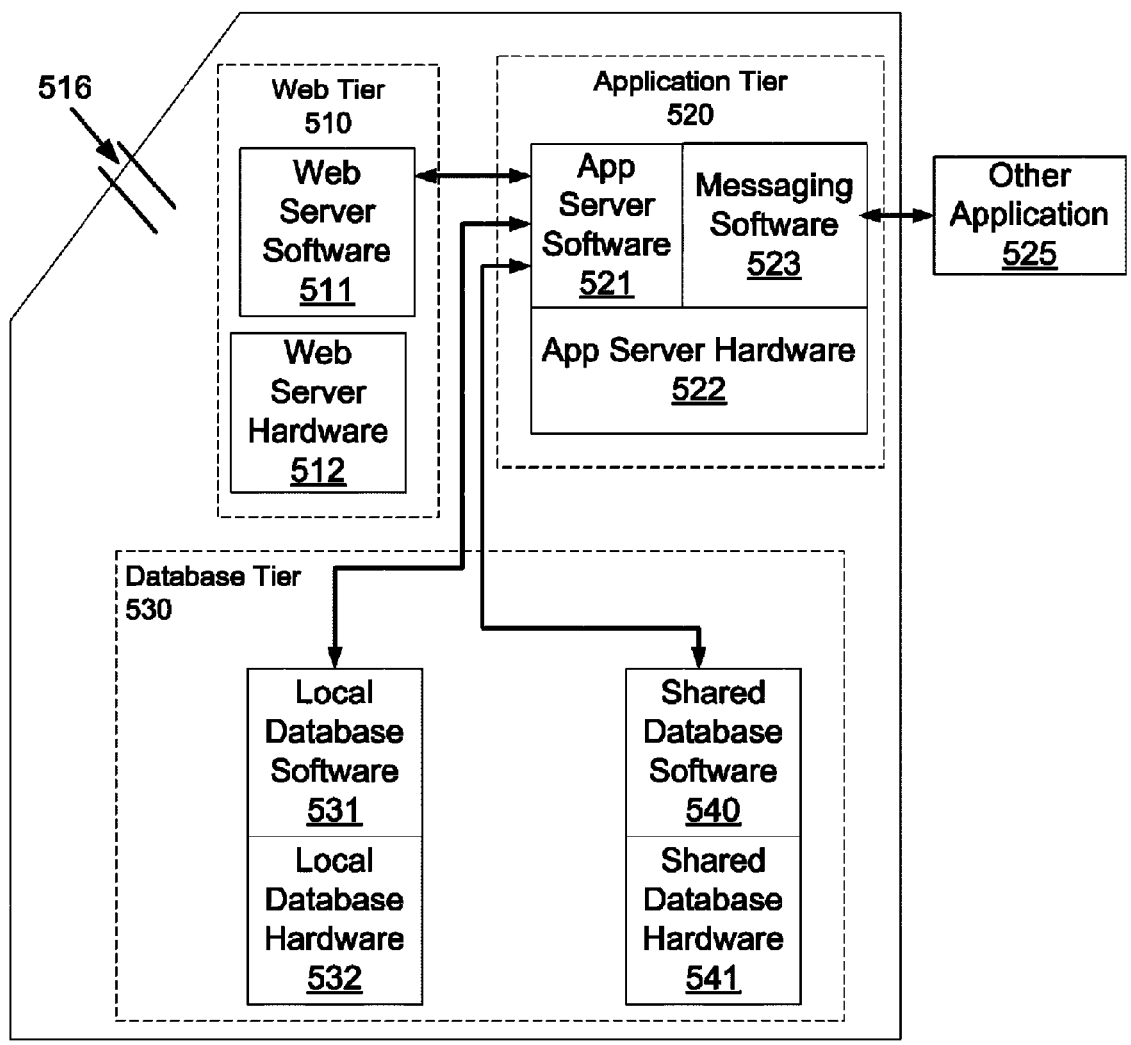
FIG. 5 illustrates an application suitable for demonstrating one or more aspects of this disclosure.

In FIG. 5, a simplified version of a web-based customer servicing application Servicer 500 is illustrated. The hardware and software components included in the application are briefly described below for purposes of introduction and for providing an example computation of a DNP composite risk score. The tier structure and components shown in the servicer 500 example are illustrative. The principles of the risk framework apply equally to application of any types of tier structure or mix of components.

Servicer 500 may include a web tier 510 for user interface management, an application tier 520 for core program logic and communications, a database tier 530 for storage and retrieval of data, or other tiers as needed for an application to deliver the required functionality. The tiers of an application may contain any number of hardware and software components.

The web tier 510 may contain a web server software 511 component and/or a web server hardware 512 component. Web Server software 511 may interact with a customer through an internet access channel 516 and may use the web server hardware 512 for execution of web server functions. Customer requests made through the web tier 510 may be forwarded to the application tier 520 for processing and the results may be returned to the web tier 510 for presentment to the customer.

The application tier 520 may contain an application server software 521 component, messaging software 523 component, and/or an application server hardware 522 component. The application software 521 component may accept servicing requests from the web tier 510 and may service those requests through any combination of interactions with messaging software 523, internal program logic and/or the database tier 530. The application server software 521 may transmit servicing results to the web tier 510 and may record service transaction information to local database software 531 and/or to shared database software 540 so other applications may use the information. The application server software 521 may use application server hardware 522 for computer resources. Application tier 520 (and more specifically, messaging software 523) may be coupled to other applications. For example, as shown in FIG. 5, messaging software 523 may be coupled to other application 525. In this manner, applications (e.g., servicer 500 and other application 525) may exchange data and/or control information with one another.

The database tier 530 may respond to requests from the application tier 520 to return or store information. Requests may be directed to any number of local database software 531 components and/or any number of shared database software 540 components. Local and shared database software (531 and 540) may use local or shared database hardware components respectively (532 and 541) for computer resources.

An illustrative example of computing a DNP composite risk score is described below in conjunction with a number of the products and components included in FIG. 5 discussed above. For purposes of simplification, the discussion provided below assigns (hypothetical) product risk scores to web server software 511, web server hardware 512, app server software 521, app server hardware 522, messaging software 523, local database software 531, local database hardware 532, shared database software 540, and shared database hardware 541. In an actual implementation these product names may correspond to actual versioned product names.

As a preliminary step, all of the products associated with the servicer 500 application are classified, e.g., pursuant to step 302 described above. The product risk weights may be established in accordance with a pre-determined algorithm and may be based on a variety of factors, such as those described above with respect to step 308. Table 1 below shows the classifications and product weights corresponding with 314 in FIG. 3 for each product in the Servicer 500 example:

TABLE 1

PRODUCT CLASSIFICATIONS AND RISK WEIGHTS

| Product | Classification | Product Risk Weights |
| --- | --- | --- |
| web server software 511 | Not-Permitted | 12 |
| web server hardware 512 | Not-Permitted | 2 |
| app server software 521 | Core | 0 |
| app server hardware 522 | Declining | 1 |
| messaging software 523 | Core | 0 |
| local database software 531 | Not-Permitted | 40 |
| local database hardware 532 | Not-Permitted | 15 |
| shared database software 540 | Core | 0 |
| shared database hardware 541 | Declining | 1 |

Calculating the DNP technical risk score 374 may include a three step process that begins by calculating the sum of product weights 314 (from Table 1 above) for the four DNP technical risk score components from FIG. 3: Declining Software 338, Not-Permitted Software 344, Declining Hardware 362, and not-permitted hardware 368. Applying the example values from Table 1, the four DNP technical risk score components may be calculated as follows:

TABLE 2

DNP RISK COMPONENT SCORES

| Application | Declining Software 338 | Not-Permitted Software 344 | Declining Hardware 362 | Not-permitted hardware 368 |
| --- | --- | --- | --- | --- |
| DNP technical risk score component | 0<br>There are no corresponding software products classified as declining | 52<br>web server software 511 (12) +<br>local database software 531 (40) | 2<br>app server hardware 522 (1) +<br>shared database hardware 541 (1) | 17<br>web server hardware 512 (2) +<br>local database hardware 532 (15) |

The second step to calculating the DNP technical risk score may include mathematically scaling the four DNP Technical risk score components (Table 2) so that each of the four scores falls into the same range of 0 to a predefined maximum score. The purpose for this may be to be able to apply relative weighting factors to each component score in step 3 (described below). To scale the DNP Technical risk components scores, a theoretical maximum score for each of the four DNP Technical risk component categories may be provided in a preliminary step. For illustrative purposes in this example the following values will be used as the category maximums:

TABLE 3

MAXIMUM VALUES FOR DNP TECH RISK COMPONENTS

| Maximum Declining Software | Maximum Not-Permitted Software | Maximum Declining Hardware | Maximum Not-permitted hardware |
| --- | --- | --- | --- |
| 10 | 150 | 200 | 100 |

To mathematically scale the four DNP Technical risk component scores for Servicer 500, each of the four component scores in Table 2 may be divided by the corresponding component maximum in Table 3 to give a percentage. The calculated percentage may be multiplied by the maximum value for the final DNP Technical risk score 374 to give scaled values for each DNP Technical risk component scores. The maximum value for the final DNP Technical risk score 374 is established in a preliminary step and is selected to provide the level of granularity desired in the final DNP Technical risk score 374. In the Servicer 500 example the maximum value for the final DNP Technical risk score 374 is chosen to be 200, providing a range of 0-200 for the resulting DNP Technical risk score. Any other value greater than 0 may be used for the DNP technical risk score 374 maximum. The choice of maximum value may be influenced by factors such as the number of applications to be scored, the number of products that may be used by applications, alignment with other risk management metrics, or any other factors.

As an example of how step two applies to the Not-Permitted Software 344 product, the Not-Permitted Software 344 score of 52 (Table 2) may be divided by the maximum Not-Permitted software value of 150 (Table 3) to give a rounded result of 0.35 (or 35%) which may then be multiplied by the DNP Technical Risk score maximum of 200 to produce a rounded component risk score of 70.

Following are the resulting scaled factors for all four categories for Servicer 500.

TABLE 4

CALCULATED VALUES FOR DNP TECHNICAL RISK COMPONENT

| | Declining software 338 | Not-Permitted software 344 | Declining hardware 362 | Not-permitted hardware 368 |
| --- | --- | --- | --- | --- |
| Step 2.1 - percentage of component score maximum | 0%<br>(0/10) | 35%<br>(52/150) | 1%<br>(2/200) | 17%<br>(17/100) |
| Step 2.2 - Scaled DNP Technical risk component scores. (Scaled by DNP Technical Score maximum | 0<br>(0% * 200) | 70<br>(35% * 200) | 2<br>(1% * 200) | 34<br>(17% * 200) |

A third step to calculate the DNP Technical risk score 374 for Servicer 500 may be to apply predefined weighting factors to the scaled DNP technical risk component scores in Table 4 and then sum the result to give the final DNP Technical risk score 374. The illustrative component weights of 6%, 80%, 4% and 10% shown in FIG. 3 and described previously may be applied in the Servicer 500 example to produce the DNP Technical risk score for Servicer 500 of 59.48 (0+56+0.08+ 3.4).

TABLE 5

STEP 3 - CALCULATION OF DNP TECHNICAL RISK SCORE

| Application | Declining Software 338 | Not-Permitted Software 344 | Declining Hardware 362 | Not-permitted hardware 368 |
|---|---|---|---|---|
| Scaled risk score (Table 4) | 0 | 70 | 2 | 34 |
| Component weights (FIG. 3) | 6% | 80% | 4% | 10% |
| Weighted Scores (Row 1 times row 2) | 0 (0 * 6%) | 56 (70 * 80%) | 0.08 (2 * 4%) | 3.4 (34 * 10%) |
| DNP technical risk score (Sum of row 3) | | 59.48 | | |

An application profile table may be constructed for Servicer 500 in accordance with application profiles 320 described above. For example, Table 6 shown below demonstrates a variety of factors that may be scored on a scale of 0 to 1 (with 0 representing no impact and 1 representing major/significant impact) with respect to Servicer 500. While this illustrative example is merely with respect to Servicer 500, in some embodiments (and in fact, in many embodiments) multiple applications may be included in (a table of) application profiles 320. The data of Table 4 may be stored in memory or a database associated with application profiles 320 of FIGS. 3 and 4.

TABLE 6

APPLICATION PROFILE SCORES

| Application | Size or Scope of Implementation | Shares a Customer Interface | Personal or Sensitive Data | Number or Volume of Transactions Supported |
|---|---|---|---|---|
| Servicer 500 | 0.9 | 0.8 | 0.4 | 0.7 |

With respect to the scores shown in Table 6, Servicer 500 may be implemented in 72% of the countries world-wide and thus may have a relatively wide size/scope of implementation. Servicer 500 may share an important customer interface, to the extent that customers may expect Servicer 500 to accept their transactions each and every time with a 100% success rate in terms of accuracy. Servicer 500 may temporarily store personal data; e.g., Servicer 500 may store account number and balance information for the last thirty customers in order to facilitate troubleshooting activity and thus Servicer 500 may store relatively little customer data for short periods of time. Servicer 500 may account for 70% of a business's (e.g., a bank's) transactions. In this illustrative example, the average score in Table 4 is (0.9+0.8+0.4+0.7)/4=0.7.

With regard to determination of business criticality score 406 of FIG. 4, the application profile scores provided in Table 6 may be applied to a previously determined maximum business criticality score to calculate a business criticality score for Servicer 500. In this example, the maximum business criticality score is set at 200 to be consistent with the DNP technical risk score 374 maximum value. The business criticality score 406 for Servicer 500 is calculated to be 140 which may be calculated as the average of the application profiles scores provided in Table 6 (which, in this example, is equal to 0.7) multiplied by the maximum value of the business criticality scores (which, in these examples is 200, given a risk range from 0 to 200). In some embodiments, the algorithm to compute the business criticality score may be dependent on a subset of the factors shown in Table 6 (e.g., size/scope of implementation, shares a customer interface, personal or sensitive data, and number or volume of transactions supported), different or additional factors than those shown, and the like. In some embodiments the factors used may be weighted relative to one another in order to emphasize a factor relative to the other factors in computing the business criticality score.

Continuing the above example, having computed a DNP technical risk score (374) and a business criticality score (406), the two may be combined using a predetermined algorithm. For example, referring to FIG. 4, the computed DNP technical risk score and business criticality score may be combined as a weighted sum in order to compute a DNP composite risk score (412). Using the weights of 80% and 20% shown in FIG. 4, in this illustrative example the DNP composite risk score for Servicer 500 is equal to ((59.48*80%)+(140*20%))=75.584.

While the above example relates to the computation of a DNP composite risk score (412) for Servicer application 500, the example computation may be adapted to accommodate any other type of application, products, components and the like. Moreover, the algorithm used to compute the DNP composite risk score may be modified or altered in some embodiments.

The computation of a DNP technical risk score may be based on product risk value, application inventory and application criticality scores (which may be embodied or incorporated into a business criticality score), an identification of products used by an application, a determination of hardware/software components that are not permitted or in decline, and an inventory of hardware products used in all applications.

In addition to weighting, one or more of the calculations described above with respect to the computations of software risk scores, hardware risk scores, DNP technical risk score, business criticality score, and DNP composite risk score may undergo normalization to facilitate a comparison between applications, products, and/or hardware/software components. In this manner, consistency may be maintained across business units or application/product/hardware/software lines. Furthermore, in terms of timing, one or more of the referenced scores may be computed periodically (e.g., at the end of a business quarter), on-demand, or a combination thereof. Accordingly, the scores may be computed to give a current snapshot of the risk a business (e.g., a financial services firm) is confronted with at any given point in time. Additionally, one or more of the scores may be outputted for review. The outputting of the one or more scores may include displaying the scores on a computer display screen, sending the scores to one or more printers, transmitting or formatting the scores in an e-mail, text message, spreadsheet, word processing document, facsimile/fax, instant message, or the like.

The computed scores may be filtered to provide a business with any degree of risk resolution. For example, a manager or officer of the business may obtain a high-level overview of the risk associated with numerous applications. Thus, the manager/officer may be able to make better decisions regarding which applications the business will continue to support and allocate funding on that basis. On the other hand, a product line manager or engineer of the business still may have the ability to trace risk to the lowest hardware and software component implementation levels. As such, the product line manager/engineer may be better positioned to determine which hardware/software components to include from a library of components in a new design based on the hardware/software component risk computations.

One or more status messages may be associated with the computed scores. For example, risk scores ranging in the top ⅓ of a risk score range may be given a status of "urgent," risk scores in the median ⅓ of a risk score range may be given a status of "elevated," and risk scores in the lower ⅓ of a risk score range may be given a status of "no action required." Different ranges and status messages may be used in some embodiments to facilitate review at various degrees of resolution. The status messages may be presented in an auditory manner (e.g., alerts, beeping sounds, and the like), a visual manner (e.g., a text message, a spreadsheet or word processing document, a fax/facsimile, an e-mail, or an instant message), or the like.

Upon reading this disclosure, one of skill in the art will appreciate that the computed scores may provide insight into risk in advance of when such risk would be apparent otherwise. For example, if an application incorporates a number of products, and each of the products contributes relatively minimal risk standing alone, using traditional techniques the risk due to the aggregation of products might not be apparent until it is too late (e.g., until the risk associated with one or more of the products has increased to a sufficient extent such that the risk has manifested itself in an adverse way). Aspects of this disclosure, and in particular, the computed scores described herein, may allow one to obtain advance notice or warning of the interplay of risk associated with, e.g., products. Accordingly, risk mitigation strategies may be adopted in advance of when the risk has actually manifested itself as a problem/issue.

In addition to computing (current levels of) risk at any given point in time, trending techniques may be used to facilitate forecasting. For example, a review of historical computed scores may be undertaken to assess the likelihood that risk will continue to increase, decrease, or remain the same. In some embodiments, a degree of confidence may be associated with the trends in order to facilitate decision making processes regarding computed risk. For example, if an application or product is subject to seasonal fluctuations in terms of demand, the time of year may be taken into consideration when associating a degree of confidence with the trends.

Figure 6:
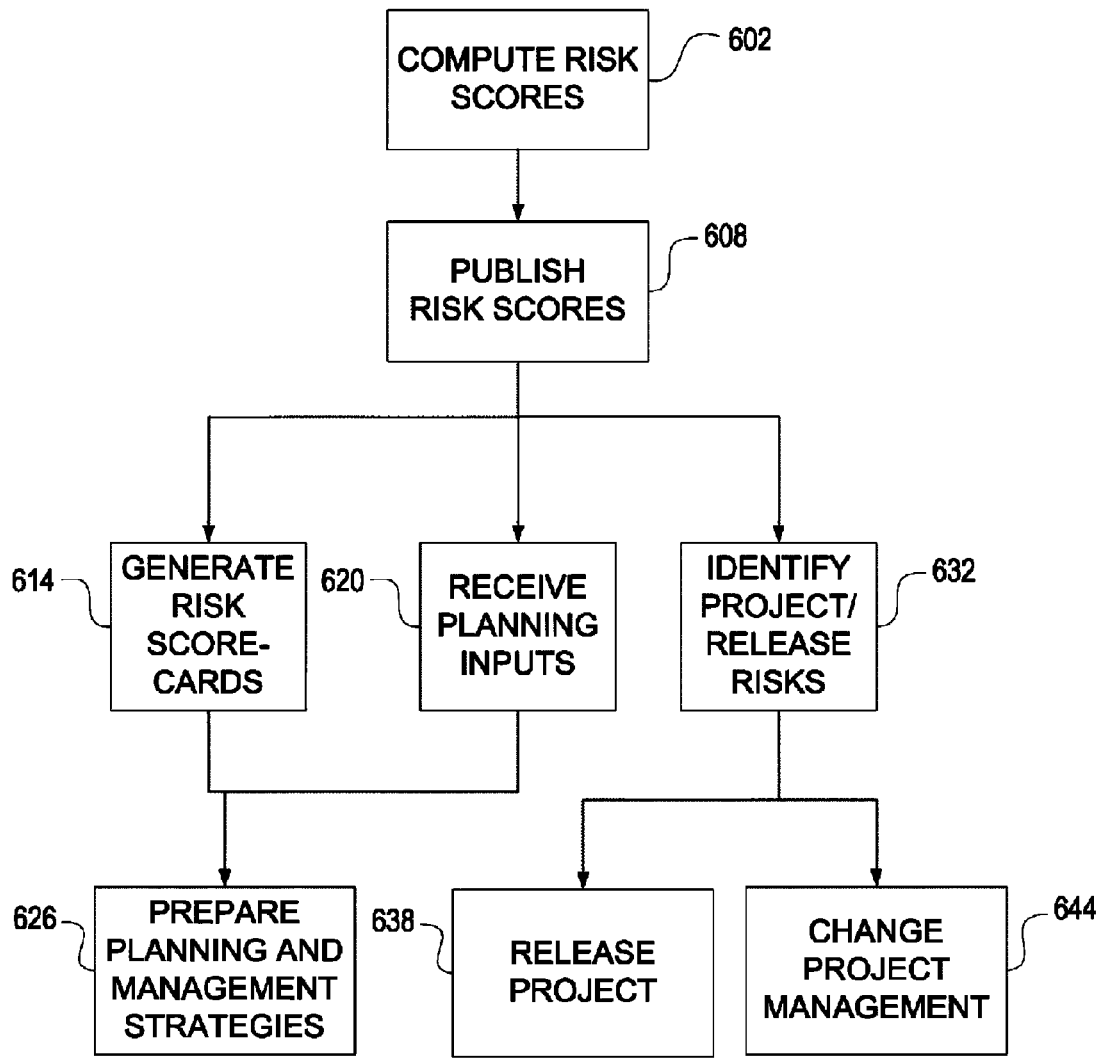
FIG. 6 illustrates a method for using DNP risk scores in accordance with one or more aspects of this disclosure.

FIG. 6 illustrates a method that may be used in conjunction with one or more aspects of this disclosure. In FIG. 6, DNP risk scores are used to facilitate risk mitigation planning and strategies. As shown in FIG. 6, in step 602 risk scores (e.g., DNP composite risk score 412 of FIG. 4) may be computed. The risk scores may be computed in accordance with the methods and techniques described above.

In step 608, the computed risk scores of step 602 may be published. Publishing may entail sharing the risk scores with business units, departments, or teams. The publication may take place in accordance with one or more security features in order to ensure that sensitive information is protected. For example, in order to obtain access to the published risk scores, a user may first have to successfully enter an authorization code, such as a password, personal identification number (PIN), a response to a challenge question, a retinal scan, a fingerprint scan, or the like. The publication of step 608 may take place automatically. For example, the publication may take place at the end of every business quarter, at the end of every fiscal year, or at other designated time periods. Alternatively, or additionally, the publication may take place responsive to a manual command, thereby facilitating on-demand publication.

In step 614, risk score cards may be generated based on the published risk scores of step 608. The risk score cards may include at least some of the risk scores published in step 608. For example, the risk score cards may serve to filter or sort the risk scores. The risk score cards may remove risk scores that do not indicate elevated levels of risk, for example. The risk score cards may also be segmented across application, product, or hardware/software lines to facilitate ease of use and distribution to management, development, operations/manufacturing teams and the like.

In step 620, planning inputs may be received. Planning inputs may include production schedules, revenue forecasts, personnel reorganization plans, and the like with respect to projects already having been implemented in the field (e.g., projects that are in active use/operation). The planning inputs may represent business management's initial reaction or response to the published risk scores.

In step 626, planning and management strategies may be prepared based on the generated risk score cards of step 614 and the received planning inputs of step 620. For example, one or more algorithms may combine the score cards and the planning inputs (in any proportion) to generate and provide recommendations/strategy for mitigating risk with respect to projects (e.g., applications and products) already implemented in the field. The combination of the score cards and the planning inputs may be weighed relative to one another in order to effectuate the combination. For example, if the planning inputs of step 620 were prepared by a senior manager with twenty years experience on the job, then the planning inputs may be more heavily weighted than similar planning inputs prepared by a junior manager of only three years experience on the job for purposes of preparing the planning and management strategies of step 626. Log-in or other identification techniques, in conjunction with data related to job experience stored in a database, may be used for purposes of distinguishing between the senior and junior managers.

In step 632, project release risks may be identified. For example, risk associated with prospective projects that have not yet been implemented in the field may be analyzed to determine whether the projects are on schedule in terms of (engineering) development, materials procurement, production resources allocation, and the like, based on the published risk scores of step 608. If the risk associated with a project exceeds a first threshold value (e.g., if the project is determined to be "too risky"), the project may be released or abandoned in step 638. Conversely, if the risk associated with the project is below the first threshold value, but above a second threshold value, project management (or other personnel) may be changed in step 644. In some embodiments, if the risk associated with the project is below both the first and second threshold values, no action may be taken, or a status message/warning may be generated to advise of the risk level associated with the project.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more computing networks. In addition, various signals representing data or events as described herein may be transferred between a source and a destination in the form of electromagnetic waves traveling through signal-conducting media such as metal wires, optical fibers, and/or wireless transmission media (e.g., air and/or space).

As described herein, the various methods and acts may be operative across one or more computing servers and one or more computing networks. The functionality may be distributed in any manner, or may be located in a single computing device (e.g., a server, a client computer). Any combination of computer hardware, software and firmware may be used. For example, one or more computer languages or instruction encoding types may be used as would be appreciated by one skilled in the art.

Real-time (or substantially real-time) access to risk related information may be obtained across various levels of abstraction with respect to computing technology (e.g., hardware, software, product, application). Thus, business officials may be better equipped to make decisions, such as allocating scarce resources, to address or mitigate risk. Moreover, while the description herein tended to focus on hardware and software embodiments supporting products and/or applications, it is understood that different levels of abstraction or organization with respect to computer architectures may be taken into consideration for purposes of computing risk. For example, perspectives of risk based on firmware may also be acquired without departing from the scope and spirit of this disclosure. Similarly, mechanical component analyses and perspectives may also be included in some embodiments.

As described herein, the methodological acts and processes may be tied to particular machines or apparatuses. For example, one or more computers may include one or more processors and memory storing instructions, that when executed, perform the methodological acts and processes described herein. In some embodiments, a risk analysis server may be used. Furthermore, the methodological acts and processes described herein may perform a variety of functions including transforming an article (e.g., computer data) into a different state or thing (e.g., a computation of risk for hardware components, software components, products, and applications). The computed risk may be further transformed via weighting and normalization techniques. More generally, one or more risk scores may be transformed in accordance with a pre-determined algorithm. One or more of the risk scores may be presented to the user in the form of a print-out, display, audio message/warning, or the like.

Aspects of the disclosure have been described in terms of declining and not-permitted risk to a business/company with respect to computing technologies. One skilled in the art will appreciate that those aspects may be adapted to accommodate different types of risk, and that the aspects may be applied to any number of products, services, or a combination thereof. Furthermore, in some embodiments, additional or different risk categorizations may be used without departing from the scope and spirit of this disclosure.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A method comprising: determining a product risk value for each of one or more products included in an application;
   computing a technical risk score, by a processor, based on the product risk value of each of the one or more products;
   wherein the computed technical risk score comprises a weighted summation of a declining software score, a not-permitted software risk score, a declining hardware risk score and a not-permitted hardware risk score;
   computing a business criticality score, by a processor, based on an application profile associated with the application; and
   computing an application risk score, by a processor, for the application by transforming the technical risk score and the business criticality score in accordance with a pre-determined algorithm.

2. The method of claim 1, wherein the business criticality score is based on an application inventory score associated with the application and an application criticality score associated with the application.

3. The method of claim 1, wherein the algorithm for computing the application risk score includes weighting the technical risk score and the business criticality score and summing the weighted technical risk score and the weighted business criticality score.

4. The method of claim 1, further comprising:
   publishing the application risk score;
   generating a risk score card based on the published application risk score;
   receiving planning inputs based on the published application risk score; and
   preparing planning and managements strategies based on the risk score card and the planning inputs.

5. The method of claim 1, further comprising:
   identifying a project release risk based on the application risk score;
   determining whether the application risk score exceeds a threshold; and
   when the application risk score exceeds the threshold, releasing a project corresponding to the project release risk.

6. An apparatus comprising:
   a processor; and
   a memory having stored thereon computer-executable instructions that, when executed by the processor, perform:
   determining a product risk value for each of one or more products included in an application;
   computing a technical risk score based on the product risk value of each of the one or more products;
   wherein the computed technical risk comprises a weighted summation of a declining software score, a not-permitted software risk score, a declining hardware risk score and a not-permitted hardware risk score;
   computing a business criticality score based on an application profile associated with the application; and
   computing an application risk score for the application by transforming the technical risk score and the business criticality score in accordance with a pre-determined algorithm.

7. The apparatus of claim 6, wherein the business criticality score is based on an application inventory score associated with the application.

8. The apparatus of claim 6, wherein the algorithm for computing the application risk score includes weighting the technical risk score and the business criticality score and summing the weighted technical risk score and the weighted business criticality score.

9. The apparatus of claim 6, wherein the computer-executable instructions include at least one instruction that, when executed, performs:
publishing the application risk score;
generating a risk score card based on the published application risk score;
receiving planning inputs based on the published application risk score; and
preparing planning and managements strategies based on the risk score card and the planning inputs.

10. The apparatus of claim 6, wherein the computer-executable instructions include at least one instruction that, when executed, performs:
identifying a project release risk based on the application risk score;
determining whether the application risk score exceeds a threshold; and
when the application risk score exceeds the threshold, releasing a project corresponding to the project release risk.

11. A non-transitory computer-readable medium having stored thereon executable instructions that, when executed, cause a risk analysis server to perform:
determining a product risk value for each of one or more products included in an application;
computing a technical risk score based on the product risk value of each of the one or more products;
wherein the computed technical risk comprises a weighted summation of a declining software score, a not-permitted software risk score, a declining hardware risk score and a not-permitted hardware risk score;
computing a business criticality score based on an application profile associated with the application; and
computing an application risk score for the application by transforming the technical risk score and the business criticality score in accordance with a pre-determined algorithm.

12. The computer-readable medium of claim 11, wherein the business criticality score is based on an application inventory score associated with the application.

13. The computer-readable medium of claim 11, wherein the executable instructions include at least one instruction that, when executed, causes the risk analysis server to perform:
publishing the application risk score;
generating a risk score card based on the published application risk score;
receiving planning inputs based on the published application risk score; and
preparing planning and managements strategies based on the risk score card and the planning inputs.

14. The computer-readable medium of claim 11, wherein the technical risk score is based on a not-permitted risk score, and wherein the not-permitted risk score is based on at least one of: a change in business policies or contracts, a change in a regulation or law, a security breach, vendor ability to continue to support a product included in the application, employee skill or training, and a degree of complexity associated with the product.

15. The computer-readable medium of claim 11, wherein the application risk score is based on application profile scores, and wherein the application profile scores are based on at least one of: a scope of the application, a degree to which the application includes a customer interface, a degree to which the application stores personal data, and a number of transactions supported by the application.

16. An apparatus comprising:
a processor; and
memory storing instructions that, when executed by the processor, perform:
identifying one or more products included in an application, the one or more products each including at least one of a hardware component and a software component;
assigning a risk value to each of the one or more products;
generating a product weight score for each of the one or more products based on the assigned risk values;
computing an application profile score, the application profile score corresponding to an average of scores based on factors including: a scope of the application, a degree to which the application includes a customer interface, a degree to which the application stores personal data, and a number of transactions supported by the application;
generating a declining product software risk score, a not-permitted product software risk score, a declining product hardware risk score, and a not-permitted product hardware risk score for the application based on the product weight score for each of the one or more products and the application profile score;
computing a technical risk score comprising a weighted summation of the declining product software risk score, the not-permitted product software risk score, the declining product hardware risk score, and the not-permitted product hardware risk score;
computing a business criticality score based on the application profile score;
computing a composite application risk score for the application by transforming the technical risk score and the business criticality score in accordance with a pre-determined algorithm;
publishing at least one score chosen from the declining product software risk score, the not-permitted product software risk score, the declining product hardware risk score, the not-permitted product hardware risk score, the technical risk score, the business criticality score, and the composite application risk score;
receiving a planning input in response to the publication of the at least one score; and
preparing a planning and management strategy based on the published at least one score and the received planning input.

17. The apparatus of claim 16, wherein the generation of a product weight score for each of the one or more products includes generating a hardware risk weight and a software risk weight for each of the one or more products.

* * * * *